Feb. 14, 1928.

J. SLEPIAN 1,658,906

PHASE BALANCING SYSTEM

Filed June 10, 1922    3 Sheets-Sheet 1

WITNESSES:
A. J. Schiefelbein
O. B. B. Buchanan

INVENTOR
Joseph Slepian.
BY
Wesley G. Carr
ATTORNEY

Feb. 14, 1928.

J. SLEPIAN 1,658,906

PHASE BALANCING SYSTEM

Filed June 10, 1922

3 Sheets-Sheet 2

WITNESSES:

INVENTOR
Joseph Slepian.
BY
ATTORNEY

Patented Feb. 14, 1928.

1,658,906

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

PHASE-BALANCING SYSTEM.

Application filed June 10, 1922. Serial No. 567,449.

My invention relates to phase-balancing systems and it has particular relation to such systems employing single-phase synchronous condensers for effecting a phase balance.

In an unbalanced three-phase line, if the star voltages in the respective phases could be independently regulated and all made numerically equal one to another, the line would not necessarily be balanced because the voltages would not necessarily have a 120° phase displacement. If, however, the delta voltages are made to be equal in magnitude, an equilateral triangle of electromotive forces results which assures a 120° phase displacement between the respective phases. Or, in general, if the delta single-phase components of any triangle of electromotive forces be caused to have any predetermined relationship in magnitude, the various phase relationships of the voltages are absolutely dependent upon such predetermined relationship.

One of the objects of my invention, therefore, is to provide a system wherein the respective single-phase components of the delta voltages across three line conductors of a polyphase system are independently regulated in such manner as to provide an equality or any other predetermined relationship between the magnitudes of the various single-phase delta voltages.

A further object of my invention is to provide a system of distribution comprising a balanced three-phase line having three independent single-phase loads connected thereto and three single-phase synchronous condensers connected across said loads and regulated to maintain a constant voltage.

A still further object of my invention is to provide a system utilizing three single-phase synchronous machines for phase balancing in which the heating of the machines is reduced by means of interconnected damper windings.

A still further object of my invention is to provide a system in which the major portion of a balancing load is carried by a polyphase shunt balancing machine and the unbalancing effects of the internal impedance of said machine are counteracted by means of serially connected single-phase synchronous condensers regulated for constant line voltages.

Figure 1:
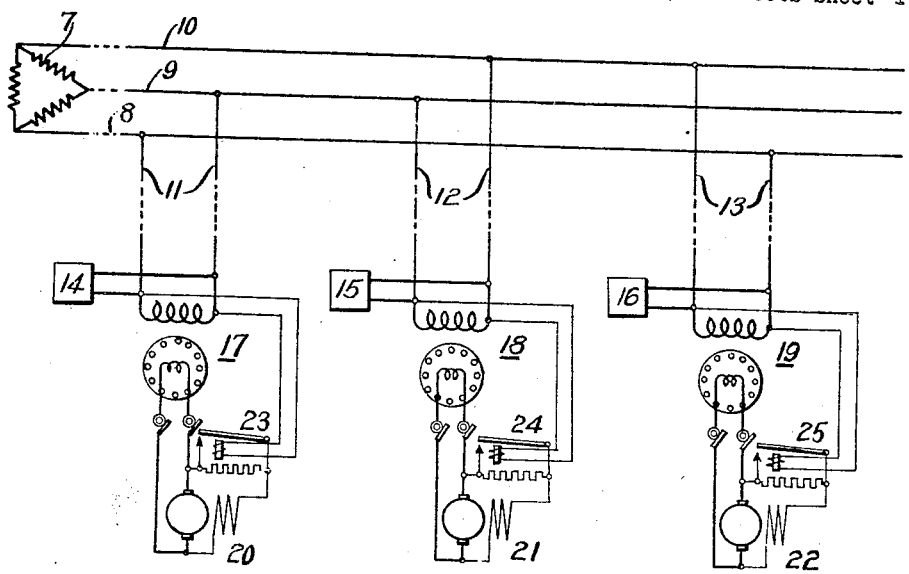

With these and other objects in view, my invention consists in the methods and apparatus pointed out in the following description and illustrated in the accompanying drawing wherein Figure 1 is a diagrammatic view of apparatus and circuits embodying my invention in a simple form.

Figures 2, 3:
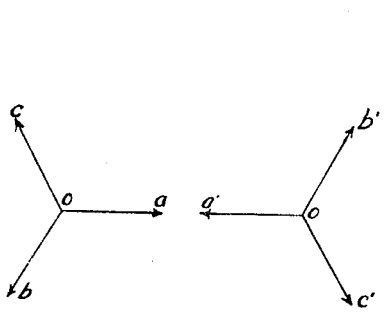
Figure 4:
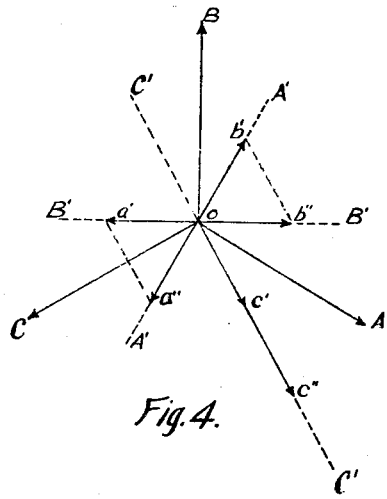
Figure 5:
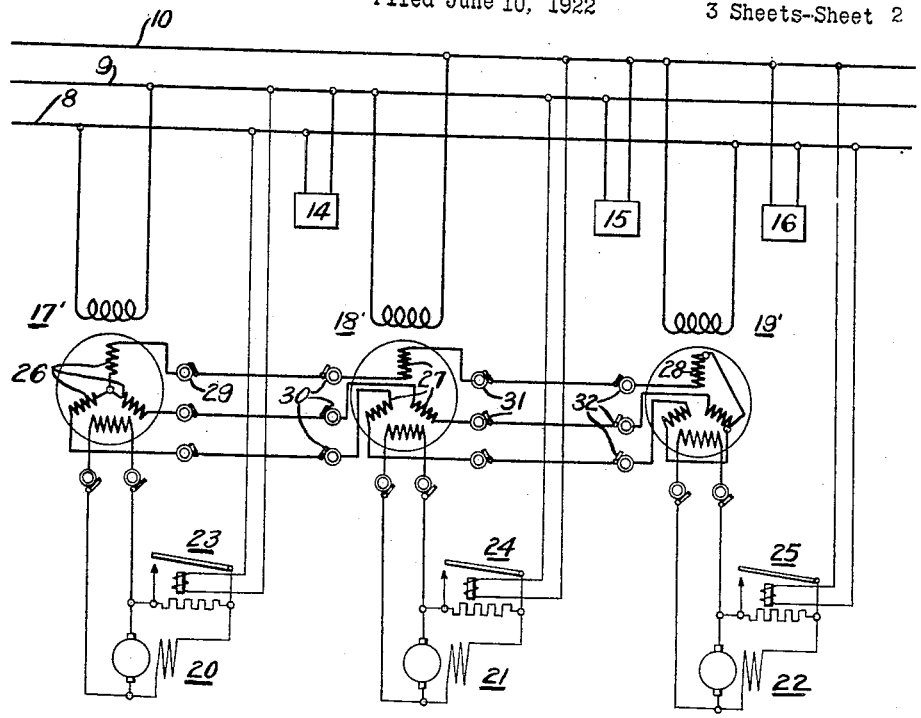
Figure 6:
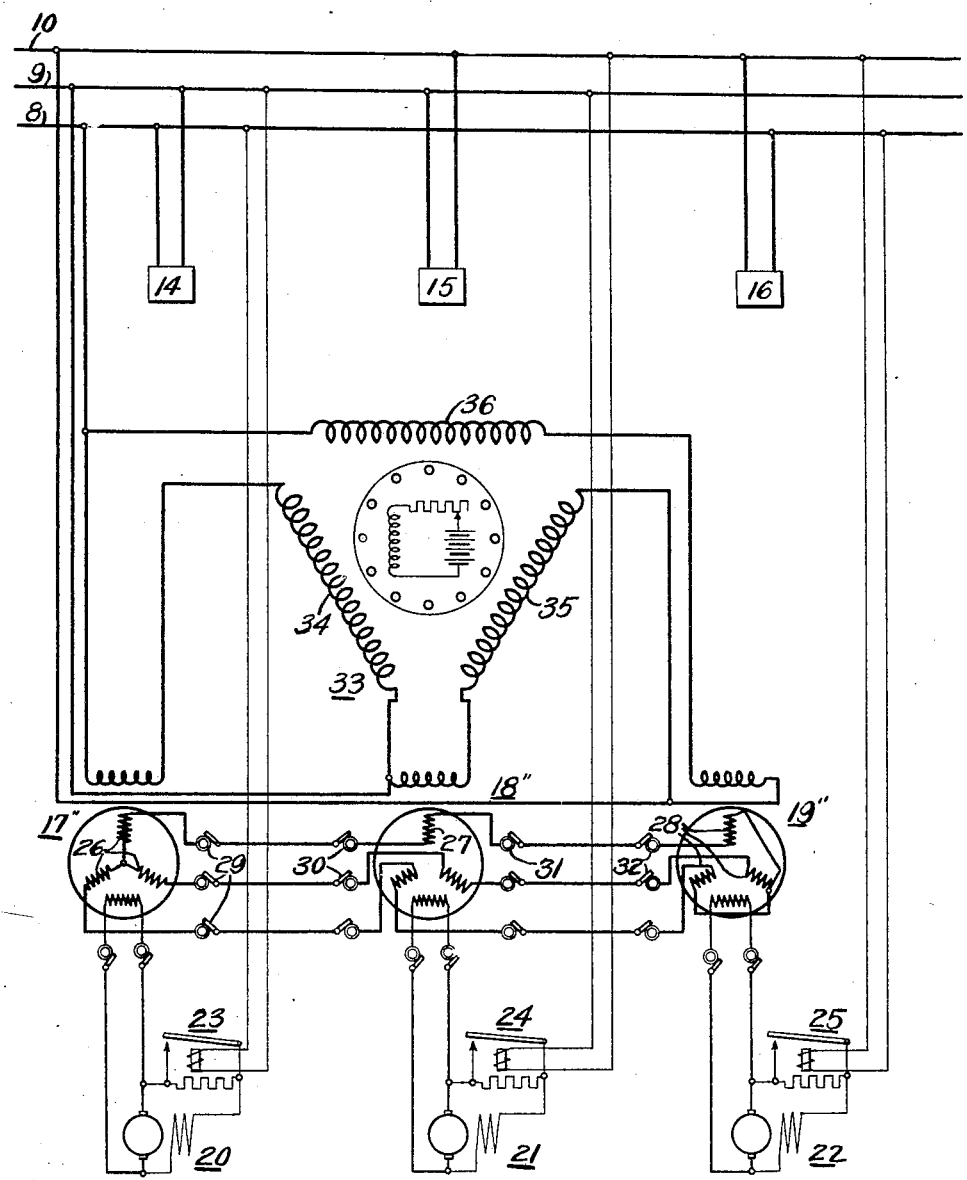

Figs. 2, 3 and 4 are vector diagrams illustrating the current and voltage relationships, and Figs. 5 and 6 are diagrammatic views showing modified embodiments of my invention.

In the form of my invention shown in Fig. 1, a three-phase source 7 supplies power to a three-phase transmission line 8, 9 and 10. Feeders 11, 12 and 13 are connected to the various delta phases of said line to supply independent single-phase loads 14, 15 and 16, respectively, which may be sections of a single-phase railway system or systems, for example. For simplicity of illustration the step-up and step-down transformers which would ordinarily be employed in practice are not shown.

Across each of the feeders 11, 12 and 13 is connected a single-phase synchronous condenser, said condensers being diagrammatically indicated at 17, 18 and 19, respectively, and being provided with direct current exciting windings which are energized from exciters 20, 21 and 22, respectively. Any suitable form of voltage regulator is employed, as indicated at 23, 24 and 25, respectively, for holding the voltage at the terminal of each synchronous condenser at any constant predetermined value.

The operation of the system just described will best be understood by reference to Figs. 2, 3 and 4. It will be understood that the unbalanced current drawn by the three independent single-phase loads 14, 15 and 16 may be resolved into a forwardly rotating major component and a backwardly rotating minor component of balanced currents. The backwardly rotating component, which is the unbalancing component, is illustrated in Fig.

2 as a balanced system of star vectors, $a$, $b$ and $c$.

In order to neutralize the unbalancing effect of the single-phase loads it is, therefore, necessary for the synchronous condensers 17, 18 and 19 to draw from the line equal and opposite currents indicated, in Fig. 3, by the vectors $a'$, $b'$ and $c'$.

If the forwardly rotating voltage vectors are represented by the star voltages A, B and C, in Fig. 4, and the backwardly rotating currents are indicated by the vectors $a'$, $b'$ and $c'$, it will be seen that the respective currents are not in 90° phase relationship to the corresponding voltages. Since, however, no power is supplied to, or derived from, any of the single-phase synchronous condensers 17, 18 and 19, it is evident that the current drawn thereby must bear a 90° relationship to the corresponding voltages or the star current vectors must lie in lines $A'A'$, $B'B'$ and $C'C'$, respectively, which are perpendicular to the respective voltages A, B and C.

In order to cause the currents drawn by the respective machines to fall in said lines, a circulating current will be established in the delta circuit comprising the feeders 11, 12 and 13, the primary windings of the machines 17, 18 and 19 and the intervening portions of the transmission line 8, 9 and 10. The circulating current just mentioned will appear as a zero-phase-sequence current comprising vectors $a'a''$, $b'b''$ and $c'c''$ which are equal in magnitude and parallel one to another.

By taking the resultant of the vectors just mentioned and the corresponding vectors $a'$, $b'$ and $c'$, respectively, it will be found that currents $Oa''$, $Ob''$ and $Oc''$ may be drawn which are in 90° phase relationship to the corresponding voltage vectors, thus proving that the unbalanced load currents may be balanced by means of purely wattless currents drawn by the respective single-phase machines, of which one component is a zero-phase-sequence current circulating around the delta-connected primary windings of the three machines.

While I have illustrated the vectors as star vectors for facility of illustration, it is obvious that the same demonstration applies to the delta quantities, as the same vectors may be employed to form the delta diagram.

A little reflection will show that the particular conditions illustrated in Fig. 4, wherein the vector representing the circulating zero-phase-sequence currents is in phase with one of the load-current vectors, namely, $Oc'$, represents an extreme case in which one of the single-phase machines is carrying a maximum current which is twice the current corresponding to the negative-phase-sequence or unbalancing load current, while the other two single-phase machines are each carrying a current equal to said component.

In Fig. 5, I have shown an arrangement whereby the zero-phase-sequence circulating currents may be avoided, thereby reducing the heating in the individual machines. It will be noted that the circulating currents were inaugurated by reason of the requirement that the currents drawn by the machines should be entirely wattless, either leading or lagging. If, however, power is interchanged between the three machines, the currents drawn by the primary windings thereof may be made substantially equal to the currents represented by the vectors $a'$, $b'$ and $c'$, thus reducing the heating, as above mentioned.

Since the single-phase current in the primary winding of each machine produces two equal fields rotating in opposite directions, and one of said fields produces the currents circulating in the damper windings of the machine, it is evident that the relative magnitudes of the primary currents in the three machines may be controlled by controlling the relative magnitudes of the circulating damper currents in the respective machines.

In Fig. 5 is shown a system in which the respective machines 17', 18' and 19' are provided with wound damper windings 26, 27 and 28, respectively, which are connected, through suitable slip rings 29, 30, 31 and 32, to form a series closed-circuit such that the current in each phase of each damper winding must pass through the corresponding phases of the other damper windings. With this arrangement, the operation of the voltage regulators 23, 24 and 25 maintaining the respective voltages equal and constant, causes each machine to draw current of the proper phase and magnitude to neutralize the unbalancing component currents in the transmission line 8, 9, 10.

As the aggregate of the three single-phase machines 17, 18 and 19 of Fig. 5 is about 40% larger in size than a single polyphase machine of the same k. v. a. rating, it may be desirable, under some circumstances, to employ an ordinary polyphase shunt-connected phase balancer to perform the major portion of the balancing operation, utilizing the single-phase machines merely as means for overcoming the unbalancing effect of the internal impedance-drops in the shunt balancer.

In Fig. 6, I have illustrated such a system wherein a shunt balancer machine 33 has a three-phase primary winding 34, 35, 36 said windings being serially connected, respectively, with the primary windings of the single-phase machines 17'', 18'' and 19'', the whole being connected in delta across the transmission line 8, 9, 10. The single-phase machines 17'', 18'', 19'' in this case may be very small, as each machine merely develops enough electromotive force to compensate for the impedance losses of the shunt balancer 33, the magnitude of the voltages being controlled by means of the voltage regulators 23, 24 and 25 which are each connected to respond to the corresponding line voltages, as in the preceding figures.

A somewhat related system utilizing induction regulators for balancing the voltages in a three-phase line is shown and claimed in my co-pending application, Serial No. 567,450, filed simultaneously with the present application and patented August 25, 1925, No. 1,551,270.

While I have described certain characteristics of my invention in detail, therefore, and while I have pointed out certain of the most obvious principles and purposes thereof, I do not intend that the language employed in the following claims shall be limited to the precise features described, but I intend that the claims shall be construed to cover all modifications which are fairly comprehended by the language thereof, when read in connection with the prior art, regardless of the details and functions mentioned in the description or illustrated in the drawing.

I claim as my invention:

1. A polyphase system comprising a polyphase generator, a polyphase transmission line associated therewith, a plurality of independently variable single-phase load devices connected across different phases of three delta phases of said transmission line, and voltage-controlling means including three single-phase devices of which the impedance has a reactive component connected in shunt across said delta phases of said line, and means for so varying the reactive components of said devices as to maintain predetermined relative magnitudes of the three single-phase voltages of said delta.

2. A polyphase system comprising a polyphase generator, a polyphase transmission line associated therewith, a plurality of independently variable single-phase load devices connected across different phases of said transmission line at points remote from said generator, and voltage-controlling means including three single-phase devices of which the impedance has a reactive component connected in shunt across delta phases of said line at points remote from said generator, and means for so varying the reactive components of said devices as to maintain a predetermined relation between the magnitudes of the voltages in said delta.

3. A three-phase system comprising a substantially balanced three-phase generator, a three-phase transmission line associated therewith, a plurality of independently variable single-phase load devices connected across different phases of said transmission line, three single-phase devices of which the impedance has a reactive component connected in shunt across delta phases of said line, and means for so varying the reactive components of said devices as to neutralize the unbalancing effect of said single-phase load devices.

4. A three-phase system comprising a substantially balanced three-phase generator, a three-phase transmission line associated therewith, a plurality of independently variable single-phase load devices connected across different phases of said transmission line, three single-phase devices of which the impedance has a reactive component connected in shunt across delta phases of said line, and means for so varying the reactive components of said devices as to maintain constant equal voltages on all of the delta phases.

5. The combination with three polyphase conductors, of a plurality of single-phase synchronous dynamo-electric machines connected across different delta phases of said conductors, said synchronous machines having wound damper windings, and means for causing the currents drawn by said synchronous machines to maintain a predetermined phase relationship between the delta voltages of said conductors, said means comprising means for associating said damper windings in series-circuit relation and electro-responsive regulators associated with said synchronous machines for maintaining predetermined relative magnitudes of the single-phase voltages.

6. The combination with a three-phase line subject to unbalanced conditions, of three single-phase synchronous dynamo-electric machines having no material mechanical torque and having wound damper windings, means for connecting said machines in delta to said line, means for serially associating said damper windings in closed circuit and electro-responsive means for independently regulating said machines for constant line voltages.

7. The combination with a three-phase line subject to unbalanced conditions, of three single-phase synchronous dynamo-electric machines having no material mechanical torque and having wound damper windings, means for connecting said machines in delta to said line, means for serially associating said damper windings in closed circuit and electro-responsive means for independently regulating said machines for equal line voltages.

8. The combination with a three-phase line subject to unbalanced conditions, of three single-phase synchronous dynamo-electric machines having wound damper windings, means for connecting said machines in delta to said line, means for impressing such electromotive forces on said damper windings as to cause the currents therein to have a predetermined relation to said unbalanced conditions and electro-responsive means for independently regulating said machines for constant line voltages.

9. The combination with a three-phase line subject to unbalanced conditions, of three single-phase synchronous dynamo-electric machines having no material mechanical torque and having damper windings, means for connecting said machines in delta to said line, means for maintaining the currents in said damper windings at all times equal in all of said machines, and electro-responsive means for independently regulating said machines.

10. The combination with a polyphase line subject to unbalanced conditions, of a plurality of single-phase synchronous dynamo-electric machines, connecting means associating said machines with said line, a shunt phase-balancer machine having its primary phases serially associated with said connecting means, respectively, and electro-responsive means for independently regulating said machines for constant line voltages.

11. The combination with a three-phase line subject to unbalanced conditions, of three single-phase synchronous dynamo-electric machines, connecting means associating said machines with said line, a shunt phase-balancer machine serially associated with said connecting means, and electro-responsive means for independently regulating said machines for constant line voltages.

12. The combination with a three-phase line subject to unbalanced conditions, of three single-phase synchronous dynamo-electric machines having no material mechanical torque and having damper windings, means for connecting said machines in delta to said line, a shunt phase-balancer machine serially associated with said connecting means, means for maintaining the currents in said damper windings at all times equal in all of said single-phase machines, and electro-responsive means for independently regulating said single-phase machines for constant line voltages.

13. The combination with a polyphase line subject to unbalanced conditions, of a plurality of single-phase devices of which the impedance has a reactive component, each of said devices being capable of adjustment from a maximum capacitive current component to a maximum inductive current component, means for connecting said devices to said line, a shunt phase-balancing device serially associated with said connecting means, and means responsive to the respective voltages across the corresponding phases of said line for varying said devices toward maximum capacitive current component when the corresponding line voltage is too low and for varying said devices toward maximum inductive current component when the corresponding line voltage is too high.

14. The combination with a three-phase line subject to unbalanced conditions, of three single-phase synchronous dynamo-electric machines having no material mechanical torque, means for connecting said machines in delta to said line, and electro-responsive means for independently regulating said machines.

In testimony whereof, I have hereunto subscribed my name this 3rd day of June, 1922.

JOSEPH SLEPIAN.